Aug. 7, 1934.   M. P. LAURENT   1,969,375
ROTARY GATE VALVE
Filed May 22, 1930
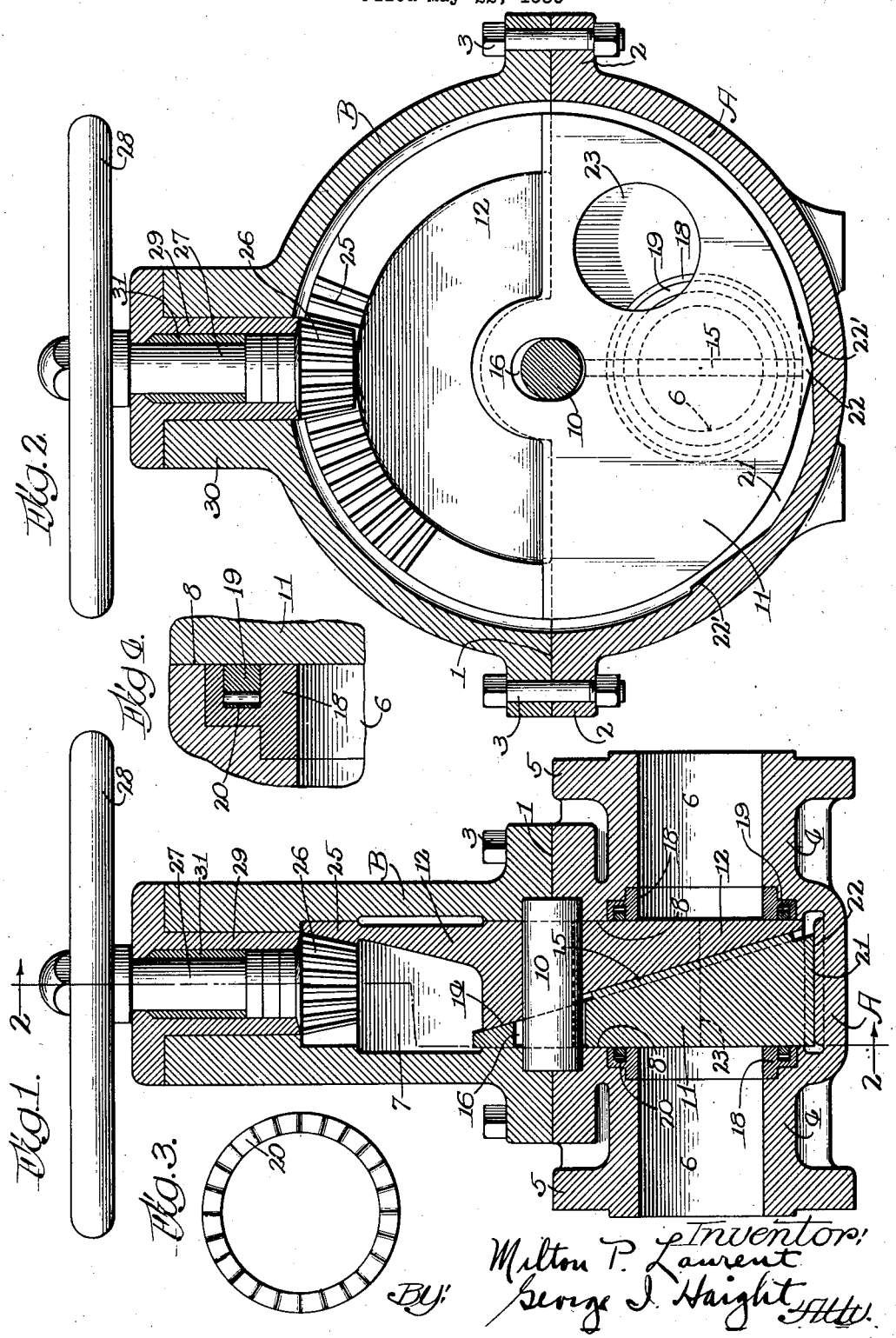

Patented Aug. 7, 1934

1,969,375

UNITED STATES PATENT OFFICE 1,969,375

ROTARY GATE VALVE

Milton P. Laurent, Houston, Tex., assignor to W-K-M Company, Inc., Houston, Tex., a corporation of Texas Application May 22, 1930, Serial No. 454,540

9 Claims. (Cl. 251—84)

My invention relates to improvements in rotary gate valves designed more particularly for use in connection with conduits or pipe lines carrying fluid, such as oil, under high pressures.

My object is to provide an improved rotary gate valve in which the pressure of the fluid controlled by the valve cannot gain access by leakage or otherwise to the interior of the valve and its working parts either in closed or open or any intermediate position to which the valve is set, my object being further to separate the gates from their operating parts therefor within the valve housing, in such manner that the operating parts will be accessible whether the gates are in closed, open or intermediate position.

A further object is to provide a rotary gate valve in which the gates and their seats will be self-cleaning whenever they are operated, thereby preventing any accumulation of dirt or sediment affecting the operation of the valve, even though it may have been closed for a long period of time.

Other objects of my invention will appear hereinafter.

Referring to the accompanying drawing,

Fig. 1 is a central vertical section of a valve embodying the invention and showing the parts in closed position;

Fig. 2 is a transverse vertical section on the line 2—2 of Fig. 1;

Fig. 3 is a detail view of one of the annular springs for the sealing rings; and Fig. 4 is an enlarged detail section of the sealing rings.

The valve, as a whole, is substantially circular in shape and the casing or housing is made up principally of a body casting A and a bonnet or cover casting B parted on a substantially central horizontal plane corresponding to the line 1, and provided with annular flanges 2 adjacent said parting line for the reception of the series of clamping bolts 3, by means of which the parts are fastened together. The valve body, below the parting line 1, has integral outstanding bosses 4 on its opposite external walls, and these bosses have flanges 5 at their outer ends, by means of which the valve may be fastened to the conduit or pipe line in connection with which the valve is used.

The bosses 4, together with the walls of the body, have ports 6 extending from their outer ends through and intersecting the interior chamber 7 of the valve body. Either one of these ports may serve as an inlet and the other as an outlet, both being identical in shape and size so that the valve can be reversibly used. The ports are preferably circular in cross section, of the same diameter, and axially aligned, so that they, together with the ports in the valve when in register therewith, form a continuous straightway passage through the entire valve body, this passage having no shoulders, angles or obstructions to interfere with the flow of fluid or to catch and clog with dirt or solid particles which may be carried along with the fluid.

The interior chamber 7 is likewise substantially circular in shape and is formed within both the body A and the bonnet B, substantially half of said chamber being within each part. The interior faces 8 of the walls of this chamber are disposed in parallel relation to each other and lie in planes exactly at right angles to the axes of the ports or passages 6 through the valve body. These faces are accurately machined flat and constitute the working faces or seats against which the members of the valve mechanism operate.

The movable or rotary valve mechanism positioned within the housing chamber 7 is rotatable in a plane transverse to the longitudinal axis of the passageways 6. This valve mechanism is rotatable on a shaft 10, the axis of which coincides with the parting line 1 between the body member A and bonnet B, each of the abutting faces of said body and bonnet members being recessed beyond the faces 8 to receive the shaft 10 and hold it firmly in position.

The rotary valve mechanism comprises two members; a segment 11, and a disc 12, arranged with their opposed or abutting faces 14 in a plane at an angle to the axis of rotation so that when the members 11 and 12 are moved relatively to each other in a direction parallel to their opposed faces 14 a wedging or cam effect is produced which expands the width of the mechanism and forces the members 11 and 12 towards the seat faces 8 of the valve chamber 7. The valve members 11 and 12, however, are locked together for rotary movement as a unit by means of a key 15 which is positioned in radially disposed keyways in both of the opposed faces 14 of said members. This interlocked construction, however, permits the relative movement of the valve members 11 and 12 in a direction transverse to the axis of rotation on the shaft 10, as hereinbefore mentioned. In order to permit this wedging action to take place, the bearing opening 16 of the valve segment 11 through which the shaft 10 extends, is elongated in a radial direction, while the bearing opening in the disc 12 snugly fits the shaft and permits only a rotary and a longitudinal movement of the disc 12 on said shaft.

The outer surfaces of the members 11 and 12 are parallel with the seat faces 8 of the valve chamber and are accurately machined so as to provide a close working fit between these faces. In addition to this, the inner ends of the passageways or ports are surrounded by concentric retaining rings 18 which contain sealing rings 19. The sealing rings are positioned within concentric grooves in the faces of the retaining rings 18 and are yieldingly urged against the outer faces of the valve members by spring rings 20 contained within said grooves. On account of this construction, the interior chamber 7 is effectively separated from the ports through which the fluid flows; hence, the pressure on the fluid cannot gain access to said chamber 7 by leakage or otherwise, thus positively eliminating any possibility of the valve mechanism being subjected to pressure within the housing chamber at any time, whether the valve mechanism is in either fully open or fully closed position, or in any intermediate position. This is due to the fact that the working surfaces of the valve mechanism and the seat faces 8 of the chamber are accurately fitted and prevent the leakage of fluid into the chamber. Leakage is further eliminated by the provision of the sealing rings 19, which yieldingly bear against the valve faces at all times. Since there is no leakage or pressure within the chamber 7, the bonnet B may be removed for access to the interior thereof, regardless of whether the valve mechanism is in closed, open or intermediate position.

The segment 11 and the disc 12 of the valve mechanism occupy substantially all of the interior of the chamber 7 within the body A of the casing, with the exception of the arcuate space 20 between the peripheries of members 11 and 12 and the wall of the casing. In order to expand the valve members tightly against the seat faces 8, the periphery of the segment 11 has a cam portion 22 which, during the rotation of the valve mechanism, is adapted to engage one or the other of the cam surfaces 22' formed on the inner peripheral surface of the wall of the chamber 7. One of these cam surfaces is arranged in a position corresponding to the closed position of the valve mechanism and the other is arranged in a position corresponding to the open position of the valve mechanism. The effect of these cams 22 and 22' is to force the segment member 11 radially with respect to the axis of shaft 10, and on account of the beveled or angular relation of the abutting faces 14 the members 11 and 12 will be forced outwardly into intimate contact with the seat faces 8. This action occurs preferably just as the valve mechanism reaches the open or closed position. In rotating the valve mechanism from one position to the other, however, the cam 21 rides off cam 22 and releases the wedging effect sufficiently to permit easy rotation of the parts.

The members 11 and 12 have circular ports 23 which are preferably the same in diameter and in register with each other so as to provide a straight passage through the valve mechanism. These ports are also preferably of the same diameter as the ports or passageways 6 and, when brought into register with the ports 6 by the rotation of the valve mechanism, form an uninterrupted passage through the entire valve body.

It will be observed that because of the accurate relation between the faces of the valve mechanism and their corresponding seat faces, there is no possibility of dirt or sediment accumulating in a way to interfere with the operation of the valve mechanism. If any dirt or sediment were to accumulate in the ports 6 or on the working faces of the valve mechanism when the valve is closed, the surfaces would be scraped clean upon rotation of the valve mechanism to open position and the accumulated dirt released will be carried along with the fluid through the valve. Thus, the valve is entirely self-cleaning the instant it is operated, even though it may have been in closed position for a long time.

Any suitable means may be provided for rotating the valve mechanism to its various positions. In the present structure, the upper portion of the valve disc 12 within the bonnet is provided with gear teeth 25 meshing with the toothed bevel driving pinion 26. This driving pinion is mounted on the lower end of the shaft 27, the upper end of which extends outside of the housing and carries a hand wheel 28 by which it may be operated. The shaft 27 is rotatably mounted in a stuffing box 29 positioned in a boss 30 integrally formed with the bonnet, and, if desired, the shaft may be provided with suitable packing 31 in the stuffing box.

It is obvious that changes may be made in the construction, arrangement and operation of the parts without departing from the scope and spirit of the invention, and I contemplate such changes as fairly fall within the scope of the appended claims.

I claim:

1. In a valve of the class described, the combination of a housing having parallel interior faces forming valve seats spaced apart relatively to each other, means forming ports intersecting said seat faces, rotary gate mechanism positioned between and having parallel faces bearing upon said seat faces and comprising two members having abutting faces at an angle to the parallel faces, said gate mechanism having a port adapted to be brought into or out of register with said other ports by the rotation of said gate mechanism, and means for shifting said gate members radially relatively to each other to expand said gate mechanism into intimate contact with said seat faces.

2. In a valve of the class described, the combination of a housing having parallel interior faces forming valve seats spaced apart relatively to each other, means forming ports opening through said faces, rotary gate mechanism positioned between said seats and having parallel faces bearing upon said seats and comprising two members having abutting faces angularly related to said parallel faces, said gate mechanism having a port adapted to be brought into or out of register with said other ports by the rotation of said gate mechanism, and means automatically operable by the rotation of said gate mechanism for expanding radially shifting said gate members relatively to expand the gate mechanism into intimate contact with the seat faces.

3. In a valve of the class described, the combination of a housing having parallel interior faces forming valve seats spaced apart relatively to each other, means forming ports opening through said faces, rotary gate mechanism positioned between and having parallel faces bearing upon said seats, said gate mechanism having a port adapted to be brought into or out of register with said other ports by the rotation of said gate mechanism, and means automatically operable by the rotation of said gate mechanism for expanding the gate mechanism into intimate contact with the seat faces, said expanding means comprising cooperating cams on the gate mechanism and the housing for shifting the gate mechanism radially with respect to its axis of rotation.

4. In a valve of the class described, the combination of a body member having an interior chamber and having ports intersecting said chamber, said body member having parallel seat faces spaced apart, rotary gate mechanism rotatable in a plane parallel to the seat faces and having cooperating faces bearing on said seat faces, said gate mechanism comprising gate members having aligned ports therein movable into and out of register with the ports in said body by the rotation of the gate members, said members having abutting faces disposed in a plane at an angle to the planes of said seat faces, and means for shifting the gate members relatively to each other in a direction radial to the axis of rotation thereof to force the gate members into intimate contact with said seat faces.

5. In a valve of the class described, the combination of a body member having an interior chamber and having ports intersecting said chamber, said body member having parallel seat faces in planes at right angles to the axes of the ports and spaced apart, rotary gate mechanism rotatable in a plane parallel to said seat faces and having cooperating faces bearing on said seat faces, said gate mechanism comprising gate members having aligned ports therein movable into and out of register with the ports in said body by the rotation of the gate members, said members having abutting faces disposed in a plane at an angle to the planes of said seat faces, and cams on one of said gate members and on the inner housing wall engageable by the rotation of said gate members for radially shifting said gate members relatively to each other to force them into intimate contact with the seat faces.

6. In a valve of the class described, the combination of a body member, an interior chamber therein, and having ports intersecting said chamber, said body member having parallel seat faces in planes at right angles to the axes of the ports and spaced apart, rotary gate mechanism rotatable in a plane parallel to the seat faces and having cooperating faces bearing on said seat faces, said gate mechanism comprising gate members having aligned ports therein, rotatable into and out of register with the ports in said body by the rotation of the gate members, said members having abutting faces disposed in a plane at an angle to the planes of said seat faces, means for shifting the gate members relatively to each other in a direction radial to the axis of rotation thereof, to force the gate members into intimate contact with said seat faces, and sealing rings surrounding said ports in said housing and yieldingly bearing upon the faces of said gate members.

7. In a valve of the class described, the combination of a body member having ports therein and parallel seat faces spaced apart, rotary gate mechanism rotatable in a plane parallel to the seat faces and having cooperating valve faces bearing on said seat faces, said gate mechanism comprising gate members having ports therein, rotatable into and out of register with the ports in said body by the rotation of the gate members, and having abutting faces disposed in a plane at an angle to the planes of said seat faces, means for shifting the gate members relatively to each other in a direction radial to the axis of rotation thereof, to force the gate members into intimate contact with said seat faces, and means for rotating said gate members in unison.

8. In a valve of the class described, the combination of a valve housing comprising a body portion and a bonnet portion separable on a horizontal plane and contained within a chamber formed partly in the body and partly in the bonnet, said body having ports therein below said parting plane and axially aligned with each other and intersecting the chamber, said chamber having parallel spaced walls forming valve seats and disposed in planes at right angles to the axes of the ports, rotary gate mechanism rotatable on an axis coincident with the parting plane of said body and bonnet and comprising a disc member and a segment member having beveled opposed faces abutting in a plane at an angle to the axis of rotation and having parallel outer faces in contact with said valve seats to prevent communication between said ports and the chamber in said housing, said disc member having a portion extending into the bonnet portion of the chamber, means connected with said disc portion and extending to the outside of the bonnet for rotating said disc and segment, a shaft for said disc and segment positioned with its axis coincident with the parting plane between said body and bonnet, and means operable during the rotation of the disc and segment for shifting said disc and segment radially relatively to each other to force their outer faces into intimate contact with the valve seats.

9. In a valve of the class described, the combination of a valve housing comprising a body portion and a bonnet portion separable on a horizontal plane and contained within a chamber formed partly in the body and partly in the bonnet, said body having ports therein below said parting plane and axially aligned with each other and intersecting the chamber, said chamber having parallel spaced walls forming valve seats and disposed in planes at right angles to the axes of the ports, rotary gate mechanism rotatable on an axis coincident with the parting plane of said body and bonnet and comprising a disc member and a segment member having beveled abutting faces in a plane at an angle to the axis of rotation and having parallel outer faces in contact with said valve seats to prevent communication between said ports and the chamber in said housing, said disc member having a portion extending into the bonnet portion of the chamber, means connected with said disc portion and extending to the outside of the bonnet for rotating said disc and segment, a shaft for said disc and segment positioned with its axis coincident with the parting plane between said body and bonnet, means operable during the rotation of the disc and segment for shifting said disc and segment radially relatively to each other to force their outer faces into intimate contact with the valve seats, and sealing rings mounted in the body surrounding the ports and yieldingly bearing against the outer faces of said disc and segment.

MILTON P. LAURENT.